(12) United States Patent
Song et al.

(10) Patent No.: US 6,889,510 B2
(45) Date of Patent: May 10, 2005

(54) NETWORKING SYSTEM FOR REFRIGERATOR AND METHOD OF UPGRADING THE SYSTEM

(75) Inventors: Dong-june Song, Busan (KR); Pyeong-ki Park, Kwangju (KR); Kyu-hwan Ahn, Busan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/422,976

(22) Filed: Apr. 25, 2003

(65) Prior Publication Data

US 2004/0016243 A1 Jan. 29, 2004

(30) Foreign Application Priority Data

Jul. 27, 2002 (KR) .......................................... 2002-44482

(51) Int. Cl.[7] .............................................. F25B 49/00
(52) U.S. Cl. ............................ 62/132; 236/51; 236/94; 340/585; 702/188; 717/174; 717/178
(58) Field of Search ..................... 62/132, 175; 236/51, 236/94; 340/585; 702/188, 182, 130; 717/168, 171, 172, 173, 174, 176, 177, 178

(56) References Cited

U.S. PATENT DOCUMENTS

| 5,904,074 A | 5/1999 | Herbert |
| 6,370,890 B2 | 4/2002 | Roh et al. |

(Continued)

FOREIGN PATENT DOCUMENTS

| CN | 2486936 Y | 4/2002 |
| JP | 8-179935 | 7/1996 |
| JP | 2001-339773 | 12/2001 |
| KR | 2000-0026846 | 5/2000 |
| KR | 2000-0042696 | 7/2000 |
| KR | 2002-0020220 | 3/2002 |
| KR | 2002-0020831 | 3/2002 |
| KR | 2002-30222 | 4/2002 |
| WO | 01/17406 | 3/2001 |
| WO | WO 01/37598 A1 | 5/2001 |
| WO | 01/63190 | 8/2001 |
| WO | 01/97458 | 12/2001 |

OTHER PUBLICATIONS

International Search Report of International Application No. EP 03253049 dated Dec. 29, 2003.
International Search Report of International Application No. PCT/FI00/00752 dated Mar. 7, 2001, which corresponds to WIPO 01/17406 (reference AG).
International Search Report of International Application No. PCT/SE01/00396 dated Jun. 21, 2001, which corresponds to WIPO 01/63190 (reference AF).
International Search Report of International Application No. PCT/GB01/02612 dated Nov. 20, 2001, which corresponds to WIPO 01/97458 (reference AE).
U.S. Appl. No. 10/442,735, filed Apr. 25, 2003, Dong–June Song et al.
Chinese Office Action Dated Dec. 17, 2004.

*Primary Examiner*—Marc Norman
(74) *Attorney, Agent, or Firm*—Staas & Halsey LLP

(57) ABSTRACT

A networking system for a refrigerator in which a network module available for both wireless and wire accesses to the network over the Internet is built, thereby allowing an access to an other network over the Internet and constructing a home network, the networking system able to be easily upgraded, and a method of upgrading the networking system.

24 Claims, 5 Drawing Sheets

U.S. PATENT DOCUMENTS

| | | | |
|---|---|---|---|
| 6,393,848 B2 * | 5/2002 | Roh et al. .................. | 62/126 |
| 6,397,606 B1 * | 6/2002 | Roh et al. .................. | 62/126 |
| 6,397,607 B1 | 6/2002 | Camp et al. | |
| 6,405,244 B1 * | 6/2002 | Bando et al. ............... | 709/206 |
| 6,453,687 B2 * | 9/2002 | Sharood et al. ............. | 62/127 |
| 6,502,411 B2 * | 1/2003 | Okamoto .................... | 62/129 |
| 6,604,235 B1 * | 8/2003 | Harrison et al. ............ | 717/168 |
| 6,607,314 B1 * | 8/2003 | McCannon et al. ......... | 400/62 |
| 6,668,240 B2 * | 12/2003 | Singh et al. ................ | 702/188 |
| 6,675,591 B2 * | 1/2004 | Singh et al. ................ | 62/129 |
| 2001/0010516 A1 | 8/2001 | Roh et al. | |
| 2001/0053963 A1 * | 12/2001 | Kim et al. .................. | 702/188 |
| 2002/0095269 A1 * | 7/2002 | Natalini et al. ............. | 702/188 |
| 2002/0180581 A1 * | 12/2002 | Kamiwada et al. ......... | 340/5.2 |
| 2002/0189267 A1 * | 12/2002 | Singh et al. ................ | 62/126 |
| 2004/0016242 A1 * | 1/2004 | Song et al. ................. | 62/132 |
| 2004/0049771 A1 * | 3/2004 | Yu ............................. | 717/172 |
| 2004/0083471 A1 * | 4/2004 | Nam et al. .................. | 717/168 |
| 2004/0088697 A1 * | 5/2004 | Schwartz et al. ........... | 717/174 |

* cited by examiner

NETWORKING SYSTEM FOR REFRIGERATOR AND METHOD OF UPGRADING THE SYSTEM

CROSS-REFERENCE TO RELATED APPLICATIONS

This application claims the benefit of Korean Application No. 2002-44482, filed Jul. 27, 2002, in the Korean Intellectual Property Office, the disclosure of which is incorporated herein by reference.

BACKGROUND OF THE INVENTION

1. Field of the Invention

The present invention relates to a networking system for a refrigerator and a method of upgrading the networking system, and, more particularly, to a networking system for a refrigerator in which a network module available for both wireless and wire accesses to the network over the Internet is built, thereby constructing a home network and allowing an access to an outer network over the Internet, the networking system able to be easily upgraded, and a method of upgrading the networking system.

2. Description of the Related Art

As the infrastructure for networking has been expanded and electric home appliances available for accessing the Internet have increasingly shown up in the market, technologies allowing the transmission of information and data between electric home appliances installed at home have become common; for example, home networking systems have been used.

The home networking system is comprised of an outer network accessible to the Internet, a network at home, and a home gateway connecting the outer network and the home network. To manage the home networking system, a central terminal is required, so as to connect and control the electronic appliances accessed to the network to thereby be operated as a unified system and to collect information from each of the electronic appliances. On the other hand, the central terminal is to display statuses of the electronic appliances accessed to the network as confirmed so as for the user to be aware of the statuses, and to control the electronic appliances as the user selects.

In order to construct a home networking system, the installation of a home server and a home gateway are separately required. Also, upgrading of the networking devices and programs for managing them in a continuous manner are needed. In this regard, since the upgrading has a comparatively short cycle, the user must pay careful attention to the system management.

SUMMARY OF THE INVENTION

Accordingly, it is an aspect of the present invention to provide a networking system for a refrigerator in which a network module available for both wireless and wire accesses to the network over the Internet is built, thereby allowing an access to an outer network over the Internet and constructing a home network, the networking system able to be easily upgraded, and a method of grading the networking system.

Additional aspects and advantages of the present invention will be set forth in part in the description that follows, and, in part, will be obvious from the description, or may be learned by practicing the present invention.

The foregoing and/or other aspects of the present invention may be accomplished by providing a networking system for a refrigerator, comprising an accessing station provided in a main body of the refrigerator, wherein the accessing station allows other electric appliances to wirelessly access the Internet; a wireless interface provided in the refrigerator main body for making a wireless access to the accessing station; a home network controlling module provided in the refrigerator main body, including a home networking interface accessing a home network constructed with a plurality of electronic home appliances that are provided outside the refrigerator main body, and a home network controlling unit supplying data about statuses of the plurality of electronic home appliances collected through the home networking interface to the wireless interface; and a wireless terminal provided as a separate unit from the refrigerator main body, making a wireless connection to the home network controlling module via the wireless interface through the accessing station of the refrigerator main body, to then display the status data of the electronic home appliances supplied through the wireless interface.

In an embodiment, the system further comprises a refrigerator controlling module provided in the refrigerator main body, including a memory, which stores therein status data of the refrigerator such as present temperature of compartments of the refrigerator, and a refrigerator controlling unit to provide the status data of the refrigerator in the memory through the wireless interface and to control a cooling system, wherein the wireless terminal wirelessly accesses the refrigerator controlling module via the wireless interface through the accessing station of the refrigerator main body, the refrigerator status data supplied through the wireless interface.

In an embodiment, the home networking interface of the home network controlling module is comprised of a Home Plug interface for accessing a power line based home network constructed by connection of power lines.

In an embodiment, the system further comprises an upgrade server having a program database, which stores therein a program for the wireless terminal and which is executed at the wireless terminal, and a server controlling unit to supply the wireless terminal program to the wireless terminal through the Internet, according to the request of the wireless terminal that accesses the Internet, to download the program, wherein the wireless terminal accesses the upgrade server of the Internet through the accessing station of the refrigerator main body, to thereby request downloading of the wireless terminal program.

In an embodiment, the program database of the upgrade server further includes a program for home networking, executed at the home network controlling module, wherein the server controlling unit supplies the home networking program to the home network controlling module through the Internet in response to the download request of the home network controlling module that is accessing the Internet, and wherein the home network controlling unit of the home network controlling module accesses the upgrade server of the Internet through the accessing station of the refrigerator main body and requests downloading of the home networking program.

In an embodiment, the upgrade server is comprised of a server employing a file transfer protocol (FTP) mode.

According to another aspect of the present invention, there may be provided a method of upgrading the refrigerator networking system, comprising allowing the wireless terminal to access the upgrade server through the accessing station of the refrigerator main body; determining whether a version of the program for the wireless terminal supplied from the upgrade server is newer than the program currently in use; downloading the wireless terminal program from the upgrade server if the version of the wireless terminal program supplied from the upgrade server is newer than the program currently in use; indicating to a user that the wireless terminal program has been downloaded; and installing the wireless terminal program according to selection by the user.

In an embodiment, the method further comprises allowing the home network controlling module to access the upgrade server through the accessing station of the refrigerator main body; determining whether a version of a program for home networking supplied from the upgrade server is newer than the program currently in use; downloading the home networking program from the upgrade server if the version of the home networking program supplied from the upgrade server is newer than the program currently in use; indicating to the user through the wireless terminal that the home networking program has been downloaded; and installing the home networking program according to the user's selection through the wireless terminal.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
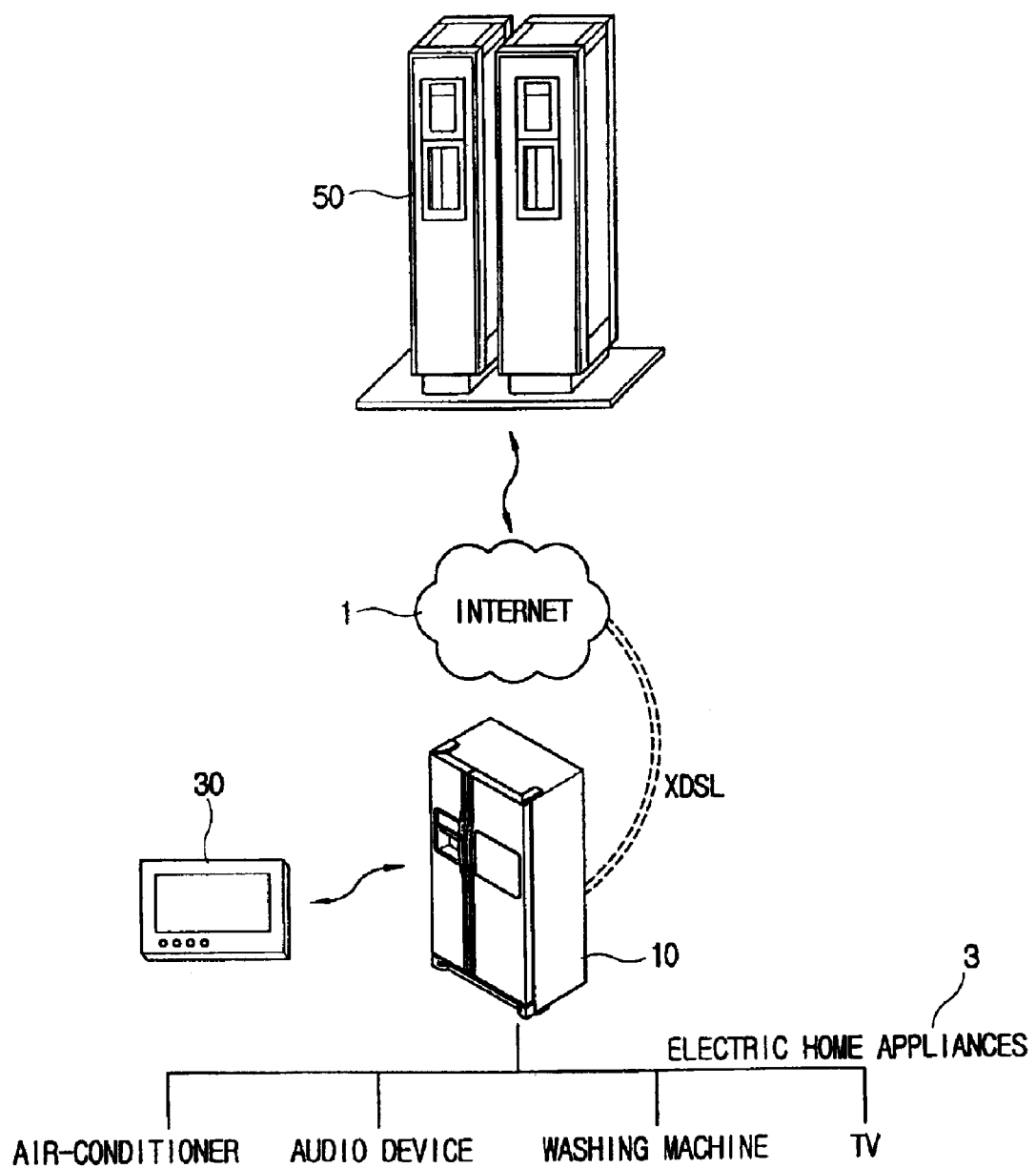
FIG. 1 is a schematic view showing a configuration of the networking system for a refrigerator according to an embodiment of the present invention.

Reference will now be made in detail to the embodiments of the present invention, examples of which are illustrated in the accompanying drawings, wherein like reference numerals refer to like elements throughout.

FIG. 1 is a schematic view showing a configuration of the networking system for a refrigerator according to an embodiment of the present invention. As illustrated therein, a networking system for a refrigerator includes a refrigerator main body 10 capable of making an access to the Internet 1 through an Internet line exclusively used for an access to the Internet, and a web pad 30 available for wireless communication with the refrigerator main body 10. To the refrigerator main body 10 constituting the present networking system is connected a home network to which a variety of electric home appliances 3 are connected.

The refrigerator main body 10 accesses the Internet 1 through the Internet line and allows the other appliances to be accessed wirelessly to the Internet 1. The refrigerator main body 10 is connected to the home network, to thereby collect and manage information from the electric home appliances 3 that are connected to the home network.

A user makes a wireless access to the refrigerator main body 10 by using the web pad 30, to then ascertain data in the refrigerator main body 10 and input commands for controlling the refrigerator main body 10. It is also possible to ascertain a status of the home network accessed to the refrigerator main body 10 through the web pad 30 and to manage the home network. The web pad 30 is available for wireless access to the Internet 1 through the refrigerator main body 10.

The refrigerator having a function of accessing the network can make an access to an upgrade server 50 through the Internet, to thereby perform upgrading of various programs.

Figure 2:
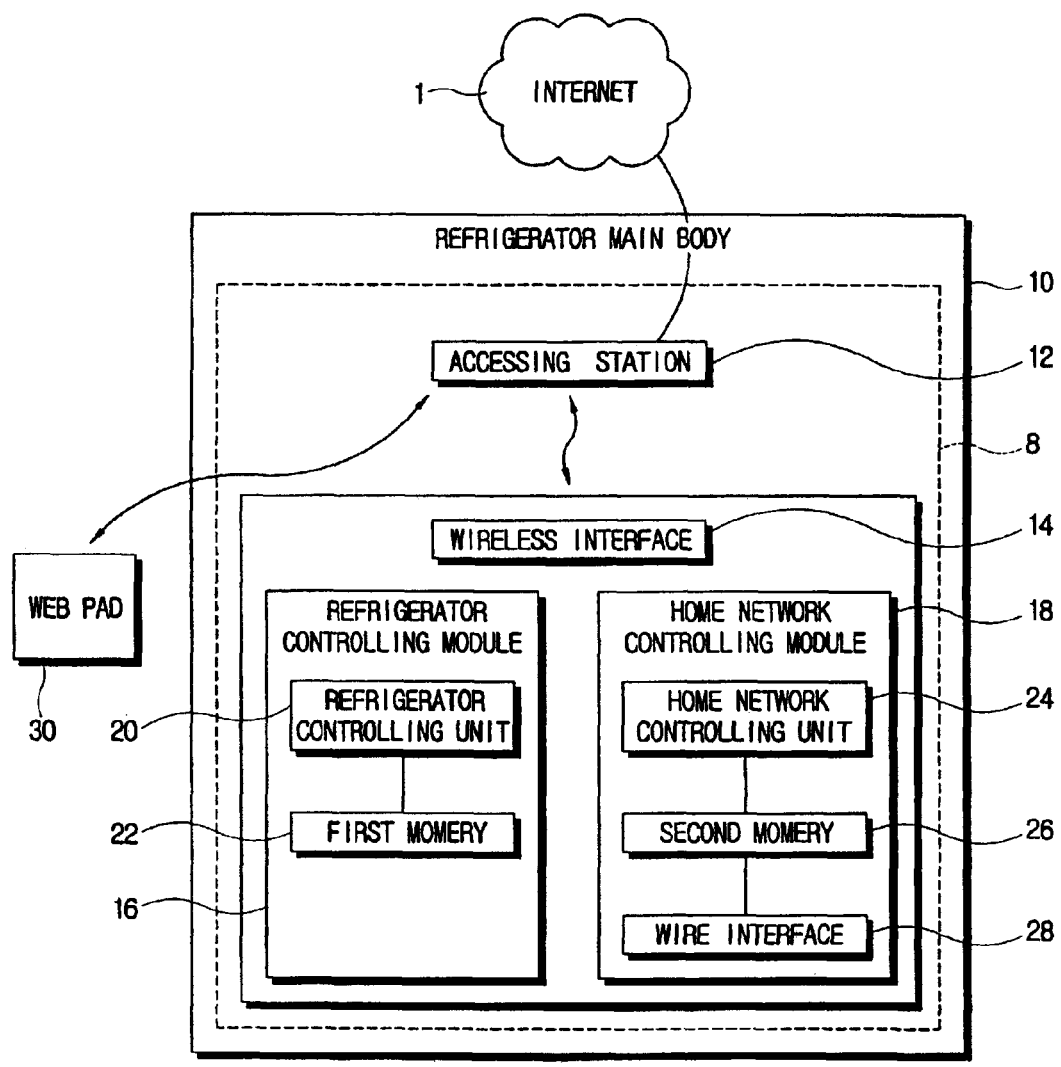
FIG. 2 is a control block diagram of the refrigerator main body and the wireless terminal shown in FIG. 1.

This function of the refrigerator will be described in detail with reference to the control block diagram of FIG. 2. As shown in this figure, the refrigerator main body 10 includes therein a network module 8 allowing a variety of network accessing functions.

The network module 8 is comprised of an accessing station 12 connected to a cable network of the outer Internet 1, and a refrigerator controlling module 16 and a home network controlling module 18 that make wireless access to the accessing station 12. The refrigerator controlling module 16 and the home network controlling module 18 are accessible to the web pad 30, which wirelessly accesses the accessing station 12 from the outside of the refrigerator main body 10.

The accessing station 12 is connected to the Internet line, allowing those units equipped with means for wirelessly accessing the Internet, such as a wireless LAN (local area network) card, to access the Internet. The accessing station 12 outputs a signal to a unit equipped with means for wireless access to the Internet in a certain area thereof, indicating that wireless access to the network is available, and on the other hand, allowing the unit in a wireless access to the accessing station 12 to access the outer Internet 1. Accordingly, the web pad 30 can make an access to the outer Internet through the accessing station 12.

The refrigerator controlling module 16 controls general functions of the refrigerator main body 10 and the home network controlling module 18 manages and controls a multiplicity of electronic units connected to the refrigerator main body 10. The refrigerator controlling module 16 and the home network controlling module 18 are available for accessing the accessing station 12 through a wireless interface 14. Accordingly, the web pad 30 provided separately from the refrigerator main body 10, the refrigerator controlling module 16 and the home network controlling module 18 can be interconnected with one other through the accessing station 12. Herein, the wireless interfaces may be provided in the refrigerator controlling module 16 and the home network controlling module 18, respectively.

The refrigerator controlling module 16 includes a refrigerator controlling unit 20 controlling a variety of units within the refrigerator main body 10, and a first memory 22 storing therein environmental data concerning a current status, a controlled status and a setup status of the refrigerator, in order to perform such inherent functions of the refrigerator as cooling and additional functions added thereto.

Here, the refrigerator controlling unit 20 of the refrigerator controlling module 16 displays the data stored in the first memory 22 on the web pad 30 in wireless connection to the refrigerator main body 10 through the accessing station 12. Thus, a user can check the current status of the refrigerator through the environmental data displayed on the web pad 30, change the setup status of the refrigerator through the web pad 30, and execute a certain function of the refrigerator through the web pad 30. A user input signal inputted through the web pad 30 is transmitted to the controlling unit 20 of the refrigerator controlling module 16, thereby controlling the refrigerator.

Further, the home network controlling module 18 includes a wire interface 28 accessing a variety of electric home appliances 3 through a wire, and a home network controlling unit 24 which checks a status of the electronic home appliances 3 connected to the home network through the wire interface 28 and stores the checked status in a second memory 22.

The home network controlling unit 24 of the home network controlling module 18 displays the data stored in the second memory 26 on the web pad 30 in connection to the refrigerator main body 10 through the accessing station 12. Thus, a user can ascertain the home network information displayed on the web pad 30 and the status of an electronic appliance 3 connected to the home network, and also control the electronic appliance 3 connected to the home network by the means of the web pad 30. A signal to control the home networking inputted through the web pad 30 is transmitted to the home network controlling module 18 through the wireless interface 14, the control signal being applied in controlling the home networking.

In an embodiment, the home networking based on the home network controlling module 18 employs a Home Plug mode using a power line as a network interface. Where the Home Plug mode is supported by the home network controlling module 18, the wire interface 28 of the home network controlling module 18 supports an interface for the Home Plug, and all the electronic appliances 3 connected to the power line at home is monitored and controlled by the home network controlling unit 24. Operation of the home network controlling module 18 is ascertained through the web pad 30 wirelessly accessed through the accessing station 12. It is also possible to input a control signal into the home network controlling module 18 through the web pad 30.

As described above, the refrigerator main body 10 of the networking system for a refrigerator according to the present invention includes therein the accessing station 12 supporting a wireless connection to the outer Internet 1, and the home network controlling module 18 for allowing the network to be constructed between electric home appliances 3, by which it is possible for the user to make a wireless access to the Internet 1 through the refrigerator main body 10. This refrigerator main body 10 can also have a function of a home gateway available for the home networking.

Figure 3:
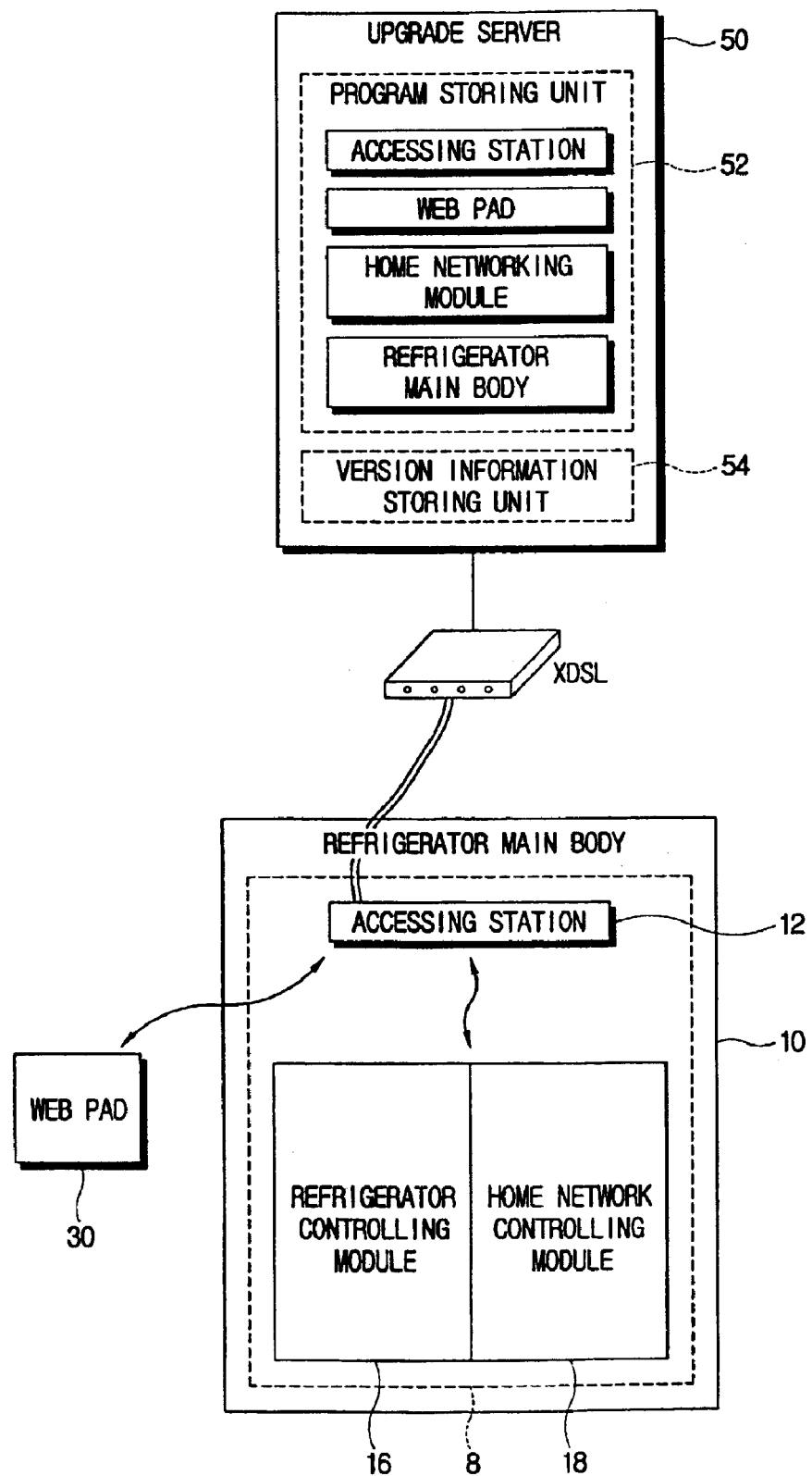
FIG. 3 is a control block diagram of the networking system for the refrigerator according to the present invention.

With this configuration, a process of upgrading the present refrigerator-networking system to manage the web pad 30 and the network module 8 when the refrigerator main body 10 and the web pad 30 of the system are both used will be described with reference to the control block diagram of FIG. 3.

As depicted therein, the refrigerator main body 10 is accessed to the outer upgrade server 40 through Internet lines such as xDSL (ADSL, HDSL, VDSL, etc.) or cable modems, etc. The accessing station 12 built in the refrigerator main body 10 supports the web pad 30, the refrigerator controlling module 16 and the home network controlling module 18 to make wireless accesses to the Internet.

Constituent elements accessible to the upgrade server 50 through the Internet line comprise the web pad 30, the refrigerator controlling module 16, and the home network controlling module 18, etc., inclusive of the accessing station 12. Because the respective constituent elements accessible to the upgrade server 50 have their independent engines for upgrading, they can automatically access the upgrade server 50, to thereby ascertain whether upgrading is needed or not.

The upgrade server 50 includes a program storing unit 52 storing therein firmware applied to the web pad 30, the accessing station 12, the refrigerator controlling module 16, and the home network controlling module 18 respectively, a storage unit 54 storing therein information about a version of the program to be upgraded. The firmware stored in the program storing unit 52 is comprised of a program in the newest version which is upgraded in response to development of relevant techniques, and will be updated from time to time when any new version of the program is developed.

The upgrade server 50 has its own fixed address with which each constituent element is allowed to access it. Since the upgrade server 50 is a server structured for provision of program files, it is most preferable that it comprises an FTP (file transfer protocol) server.

In accordance with this, a constituent element in access to the upgrade server 50 is allowed to ascertain the version of the program stored in the version information storage unit 54, to confirm whether the program currently in use has been updated to the newest version. Where the newer version of the program has been discovered, the relevant program in the newer version from the program storing unit 52 is downloaded thereinto.

The constituent element into which the newer version of program is downloaded indicates that the program has been upgraded, so as to allow the user to select an installation of the new version of the program. The firmware can be upgraded by downloading the program according to the user's selection.

Figure 4:
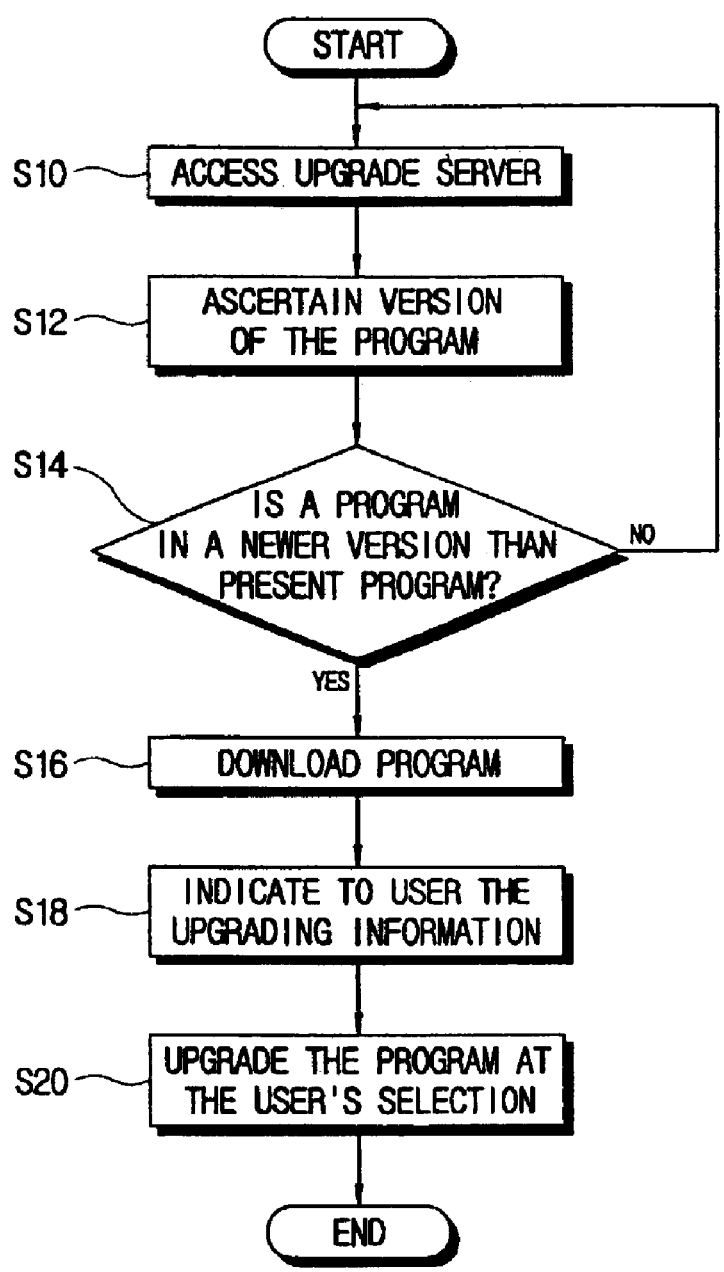
FIG. 4 is a flow chart showing a process of upgrading the refrigerator-networking system according to an embodiment of the present invention.

FIG. 4 is a flow chart showing a process of upgrading the refrigerator-networking system according to one embodiment of the present invention wherein a method of upgrading the web pad 30 is illustrated.

The web pad 30 accesses the upgrade server 50 of the outer Internet 1 by wireless connection through the accessing station 12 provided in the refrigerator main body 10 (S10). The web pad 30 ascertains the data stored in the version information storing unit 54 of the upgrade server 50 to thereby confirm the version of the program for the web pad 30 currently provided from the upgrade server 50 (S12). The web pad 30 determines whether the version of the program presently provided from the upgrade server 50 is newer than the version of the program presently driven for the web pad 30 (S14). Where it is determined that the newer version of program has been supplied, the web pad 30 downloads the program from the program storing unit 52 of the upgrade server 50 (S16). The web pad 30 indicates for the user through the displaying window thereon that the upgraded program has been downloaded (S18). Where the user selects to install the program, the downloaded program is installed, to thereby upgrade the program (S20).

Through the above-described process, the upgrading engine functions are programmed into the web pad 30, and thereby, the upgrading is possible. The cycle of accessing the upgrade server 50 of the web pad 30 is predetermined at the time of manufacturing the same, or it may be modified by the user.

Figure 5:
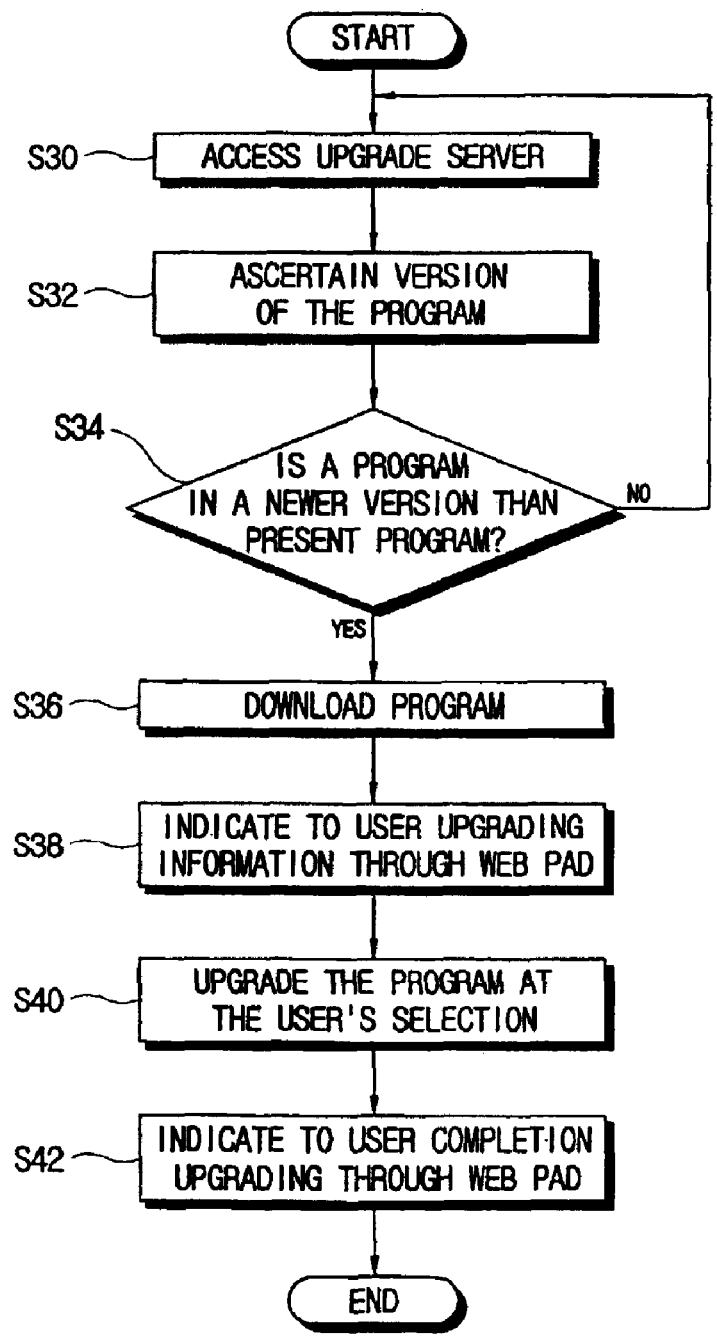
FIG. 5 is a flow chart showing a process of upgrading the refrigerator-networking system according to another embodiment of the present invention.

The processes of upgrading the accessing station 12, the home network controlling module 18, and the refrigerator controlling module 16, all of which are not equipped with displaying windows, are as shown in FIG. 5. For the sake of convenience, a process of upgrading the accessing station 12 will be exemplified.

According to the cycle of accessing the upgrade server 50 as predetermined, the accessing station 12 makes an access to the upgrade server 50 of the Internet 1 (S30). The accessing station 12 ascertains the present version of the program relevant to the accessing station 12 provided from the upgrade server 50 by confirming the data stored in the version information storing unit 54 of the upgrade server 50 (S32). The accessing station 12 determines whether the program provided by the upgrade server 50 is of a newer version than the program driven on the accessing station 12 (S34). Where it is determined that the newer version of program has been supplied, the accessing station 12 downloads the program from the program storing unit 52 of the upgrade server 50 (S36). If the program is downloaded, the accessing station 12 indicates for the user through the displaying window of the web pad 30 that the upgraded program has been downloaded (S38). Where the user selects to install the program through the web pad 30, the downloaded program is installed, to thereby upgrade the program (S40). If the upgrading of the program is completed, the accessing station 12 again indicates for the user through the web pad 30 that the program has been completely upgraded (S42).

As described above, the accessing station 12, the home network controlling module 18, and the refrigerator controlling module 16, having no separate displaying units, inform the user of installation of the upgraded network through the web pad 30, and upgrade the program according to the user's selection through the web pad 30.

The upgrading processes can be performed by the respective upgrading engine programmed independently by constituent elements, and each constituent element makes an access to the upgrade server 50 independently to download the program.

In an embodiment, the upgrade server 50 is comprised of an FTP server. It is also preferable that each constituent element is accessed to the upgrade server 50 in an FTP mode.

As describe above, according to the present invention, since the refrigerator main body is comprised of an accessing station supporting a wireless access to the Internet, and a home network controlling module constructing a network between electric appliances at home, allowing the wireless terminal to be accessed to the Internet wirelessly through the refrigerator main body, the refrigerator main body can serve as a home gateway for connecting networks at home. Further, the accessing station built in the refrigerator main body, a refrigerator-controlling module, a home network controlling module, and the web pad provided as a separate unit from the refrigerator main body, are allowed to make an independent access to the upgrade server, downloading the upgraded programs, thereby making it easy to manage the system.

As described above, a networking system for a refrigerator in which a network module available for both wireless and wire accesses to the network over the Internet is built, thereby allowing an access to an outer network over the Internet and constructing a home network, the networking system able to be easily upgraded, and a method of upgrading the networking system.

The components included in the system may include memories, processors, and/or Application Specific Integrated Circuits ("ASICs"). Such memory may include a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A networking system for a refrigerator, comprising:
   an accessing station provided in a main body of the refrigerator, wherein the accessing station allows other electric appliances to wirelessly access to the Internet;
   a wireless interface provided in the refrigerator main body, making a wireless access to the accessing station;
   a home network controlling module provided in the refrigerator main body, including a home networking interface accessing a home network constructed with a plurality of electronic home appliances that are provided outside the refrigerator main body, and a home network controlling unit supplying data about statuses of the plurality of electronic home appliances collected through the home networking interface to the wireless interface; and
   a wireless terminal provided as a separate unit from the refrigerator main body, making a wireless connection to the home network controlling module via the wireless interface through the accessing station of the refrigerator main body, to then display the status data of the electronic home appliances supplied through the wireless interface.

2. The system according to claim 1, further comprising a refrigerator controlling module provided in the refrigerator main body, including a memory, which stores therein status data of the refrigerator such as present temperature of compartments of the refrigerator, and a refrigerator controlling unit to provide the status data of the refrigerator in the memory through the wireless interface and to control a cooling system,
   wherein the wireless terminal wirelessly accesses the refrigerator controlling module via the wireless interface through the accessing station of the refrigerator main body, the refrigerator status data supplied through the wireless interface.

3. The system according to claim 1, wherein the home networking interface of the home network controlling module comprises a Home Plug interface accessing a power line based home network constructed by connection of power lines.

4. The system according to claim 1, further comprising an upgrade server having a program database, which stores therein a program for the wireless terminal and which is executed at the wireless terminal, and a server controlling unit to supply the wireless terminal program to the wireless terminal through the Internet, according to the request of the wireless terminal that accesses the Internet, to download the program, wherein the wireless terminal accesses the upgrade server of the Internet through the accessing station of the refrigerator main body, to thereby request downloading of the wireless terminal program.

5. The system according to claim 4, wherein the program database of the upgrade server further includes a program for home networking, executed at the home network controlling module, wherein the server controlling unit supplies the home networking program to the home network controlling module through the Internet in response to the download request of the home network controlling module that accesses the Internet, and wherein the home network controlling unit of the home network controlling module accesses the upgrade server of the Internet through the accessing station of the refrigerator main body and requests downloading of the home networking program.

6. The system according to claim 5, wherein the upgrade server comprises a server employing a file transfer protocol (FTP) mode.

7. The system according to claim 4, wherein the upgrade server comprises a server employing a file transfer protocol (FTP) mode.

8. A method of upgrading the refrigerator networking system according to claim 4, comprising:

allowing the wireless terminal to access the upgrade server through the accessing station of the refrigerator main body;

determining whether a version of the program for the wireless terminal supplied from the upgrade server is newer than the program currently in use;

downloading the wireless terminal program from the upgrade server if the version of the wireless terminal program supplied from the upgrade server is newer than the program currently in use;

indicating to a user that the wireless terminal program has been downloaded; and installing the wireless terminal program according to a selection by the user.

9. The method according to claim 8, further comprising:

allowing the home network controlling module to access the upgrade server through the accessing station of the refrigerator main body;

determining whether a version of a program for home networking supplied from the upgrade server is newer than the program currently in use;

downloading the home networking program from the upgrade server if the version of the home networking program supplied from the upgrade server is newer than the program currently in use;

indicating to the user through the wireless terminal that the home networking program has been downloaded; and installing the home networking program according to the user's selection through the wireless terminal.

10. A refrigerator in a home networking system, comprising:

a refrigerator control module to control general functions of the refrigerator;

a local network control module to control a plurality of other appliances, which are connected to the local network control module; and an access unit to connect the refrigerator to an outside network, to provide the plurality of other appliances with access to the outside network, and to provide a user with wireless access to the outside network, the refrigerator, and the plurality of other appliances, wherein the user is able to control the refrigerator and the plurality of other appliances via a wireless terminal.

11. The refrigerator of claim 10, wherein the refrigerator control module comprises:

a memory unit to store environmental data of a current status of the refrigerator, a controlled status of the refrigerator, and a setup status of the refrigerator; and a refrigerator control unit to provide control of the refrigerator to the user, wherein the refrigerator control unit transmits the current status of the refrigerator to the wireless terminal for display to the user, wherein the refrigerator control unit receives a change of the setup status of the refrigerator from the user via the wireless terminal, and wherein the refrigerator control unit receives a refrigerator control input from the user via the wireless terminal.

12. The refrigerator of claim 10, wherein the local network control module comprises:

an interface unit to connect the plurality of other appliances to the local network control module;

a memory unit to store a plurality of current statuses of the plurality of other appliances; and a local network control unit to provide control of the plurality of other appliances to the user, wherein the local network control unit transmits the current statuses of the plurality of other appliances to the wireless terminal for display to the user, and wherein the local network control unit receives an other appliance control input from the user via the wireless terminal.

13. The refrigerator of claim 12, wherein the local network control module supports a home plug mode, wherein power wiring is used to connect the refrigerator to the plurality of other appliances.

14. The refrigerator of claim 10, wherein the outside network is connected to the Internet.

15. The refrigerator of claim 10, wherein the access unit is connected to an upgrade server, and wherein the upgrade server stores firmware to upgrade the refrigerator control module, the local network control module, the access unit, and the wireless terminal.

16. The refrigerator of claim 15, wherein the upgrade server is a file transfer protocol (FTP) server.

17. A method of upgrading a home networking system, comprising:

determining a current version of at least one of a plurality of driving programs to be upgraded, wherein the driving programs respectively drive a refrigerator, at least one other type of appliance connected to the refrigerator, and a wireless terminal;

downloading a new version of the at least one driving program in response to the new version being newer than the current version;

displaying to a user a message on the wireless terminal that the new version was downloaded;

receiving from the user a command input to the wireless terminal to install the new version; and installing the new version.

18. The method of claim 17, further comprising:

displaying to the user a message that the driving program has been successfully upgraded.

19. The method of claim 17, wherein the new version of the driving program is downloaded from a file transfer protocol (FTP) server.

20. The method of claim 17, wherein the refrigerator, the at least one other type of appliance, or the wireless terminal determines the current version of the driving program and downloads the new version of the driving program.

21. A machine-readable medium that provides instructions, which, when executed by a machine, cause the machine to perform operations for upgrading a home networking system, comprising:

determining a current version of at least one of a plurality of driving programs to be upgraded, wherein the driving programs respectively drive a refrigerator, at least one other type of appliance connected to the refrigerator, and a wireless terminal;

downloading a new version of the at least one driving program in response to the new version being newer than the current version;

displaying to a user a message on the wireless terminal that the new version was downloaded;

receiving from the user a command input to the wireless terminal to install the new version; and installing the new version.

22. The machine-readable medium of claim 21, further comprising:

displaying to the user a message that the driving program has been successfully upgraded.

23. The machine-readable medium of claim 21, wherein the new version of the driving program is downloaded from a file transfer protocol (FTP) server.

24. The machine-readable medium of claim 21, wherein the refrigerator, the at least one other type of appliance, or the wireless terminal determines the current version of the driving program and downloads the new version of the driving program.

* * * * *

UNITED STATES PATENT AND TRADEMARK OFFICE
CERTIFICATE OF CORRECTION

PATENT NO. : 6,889,510 B2
DATED : May 10, 2005
INVENTOR(S) : Song, Dong-june et al.

It is certified that error appears in the above-identified patent and that said Letters Patent is hereby corrected as shown below:

Column 10,
Line 66, after "that the" insert -- new version of the --.

Column 12,
Line 8, after "that the" insert -- new version of the --.

Signed and Sealed this

Twenty-first Day of February, 2006

JON W. DUDAS
*Director of the United States Patent and Trademark Office*